United States Patent [19]

Pinone

[11] Patent Number: 5,309,825
[45] Date of Patent: May 10, 1994

[54] POPCORN VENDING MACHINE

[75] Inventor: Anthony J. Pinone, Boca Raton, Fla.

[73] Assignee: Show-Pop International, Inc., Boca Raton, Fla.

[21] Appl. No.: 27,295

[22] Filed: Mar. 4, 1993

[51] Int. Cl.5 .............................................. A23L 1/18
[52] U.S. Cl. ..................... 99/323.6; 99/323.7; 99/323.8; 99/323.9
[58] Field of Search .............. 99/357, 323.5, 323.6, 99/323.7, 323.8, 323.9, 323.11, 323.4, 476, 356; 221/150 A, 150 HC, 150 R, 125; 426/450

[56] References Cited

U.S. PATENT DOCUMENTS

| | | | |
|---|---|---|---|
| 3,253,532 | 5/1966 | Jones | 99/323.6 |
| 3,697,289 | 10/1972 | Day et al. | 99/323.11 |
| 3,812,774 | 5/1974 | Day et al. | 99/323.9 |
| 4,171,667 | 10/1979 | Miller et al. | 99/323.6 |
| 4,182,229 | 1/1980 | Vande Walker | 99/323.6 |
| 4,417,505 | 11/1983 | Pietrobelli | 99/323.9 |
| 4,727,798 | 3/1988 | Nakamura | 99/323.9 |
| 4,848,591 | 7/1989 | Wada | 221/150 A |
| 4,947,740 | 8/1990 | Strawser et al. | 99/323.7 |
| 5,033,363 | 7/1991 | King et al. | 426/450 |
| 5,035,173 | 7/1991 | Stein et al. | 99/323.7 |

FOREIGN PATENT DOCUMENTS 2186180 8/1987 United Kingdom ............... 99/323.9

*Primary Examiner*—Timothy F. Simone
*Attorney, Agent, or Firm*—Malin, Haley, DiMaggio & Crosby

[57] ABSTRACT

A vending popcorn machine for measuring out a metered amount of popcorn, cooking the popcorn fresh in the machine, and dispensing the freshly cooked popcorn into a manually positioned cup in the front of the machine. The vending machine includes a sealed, slidable dispensing mechanism that keeps the popcorn fresh at all times in its raw kernel reservoir, preventing moisture from escaping. The device also incudes a liquid flavoring dispenser that is optional that can allow for uniform distribution of a liquid flavoring on top of the freshly cooked corn.

8 Claims, 4 Drawing Sheets

POPCORN VENDING MACHINE

BACKGROUND OF THE INVENTION

1. Field of the Invention

This invention relates generally to a popcorn vending machine, and specifically, to a currency-actuated popcorn vending machine which cooks raw kernels of corn which are stored in the machine. The corn is dispensed in pre-measured quantities in response to a coin or paper money-actuated vending mechanism. The vending machine also allows for uniform distribution of a cheese or other flavored topping to be optionally administered.

2. Description of the Prior Art

Popcorn vending machines are known in the prior art. Originally, machines were utilized that dispensed already popped corn that was typically heated by lamps in pre-measured amounts into bags or other typical containers. Recently, vending machines have been displayed that allow for various types of cooking of the popcorn at the time the materials are vended and actuated by the vending machine. U.S. Pat. No. 4,947,740, issued to Strawser et al., discloses an individual serving popcorn machine operable on demand. U.S. Pat. No. 3,882,255, issued to Gorham, Jr. et al., discloses a method for preparing popcorn containing no cooking oil residue and flavored with one or more selected flavorings. U.S. Pat. No. 4,727,798, issued to Nakamura, discloses a popcorn processing machine which is capable of heating and popping raw corn rapidly, without addition of oil. U.S. Pat. No. 5,035,173, issued to Stein et al., discloses an apparatus for the automatic continuous popping of popcorn in large quantity. One of the drawbacks of conventional popcorn vending machines is that the raw corn sitting in the vending machine awaiting cooking can become dried out. This results in stale corn being utilized, diminishing from its flavor and further resulting in unpopped kernels. Another drawback in present day vending machines is that it is often desirable to provide additional flavors on the freshly popped popcorn which heretofore have not been available at the vending site.

The present invention overcomes these problems by providing a relatively simple, but very efficient popcorn vending machine which keeps the raw corn in a fresh state at all times so that at the moment of cooking, the popcorn is fresh, with the raw corn retaining its moisture as necessary in a sealed storage unit. Another improvement provided by the present invention is that it provides for uniform distribution of additional flavored toppings such as liquid cheese to be applied directly to the freshly popped corn at each vending cycle at the user's option.

Finally, another advantage of the present invention is that it is easy to operate in terms of restocking the flavored toppings, restocking the raw corn, and retrieving the monies obtained from the machine.

Several U.S. patents show a variety of types of vending machines and vending popcorn machines, none of which teach Applicant's invention.

SUMMARY OF THE INVENTION

A popcorn cooking and dispensing machine that is operated in accordance with a vending actuating mechanism that receives paper money or coins, comprising a hot air blowing cooking unit, a sealed storage container that contains the raw corn, a storage cup for retrieving the cooked popcorn, a turntable for supporting the storage cup, and a vending power unit. The vending power unit includes an electrical power supply and circuitry which provides electrical energy to the cooking unit for cooking the corn, provides electrical energy to the turntable, and provides electrical energy to a pump that allows for pumping a selected liquid flavor into the proper area for distribution on the cooked corn.

The actuating mechanism, which typically is a vending slide or vending actuating mechanism, provides mechanical linear motion to a specially developed dispensing unit that is attached at one side to the outlet of the raw corn chamber and to its opposite side to a chute that administers the popcorn into the popcorn cooker. The vending actuated dispensing slide includes a measuring cylinder that is sized to receive the exact amount of raw corn necessary for the proper serving to be cooked, a slidable chamber that on one side seals the corn storage area to prevent loss of moisture in the non-distributing position, and which provides for the measured amount of corn to be moved through the slide mechanism to the corn distribution chute into the cooker. By allowing the corn to be sealed in the non-activating position, no moisture will leave the corn chamber so that the popcorn remains fresh at all times.

The mechanism may also be activated by an electrical mechanism, be it coin or bill activated, which will activate a revolving disc with multiple chambers which pick up a measured amount of corn from the sealed container and carry it to the chute where it is conveyed to the corn distribution chute into the cooker.

The popcorn vending machine in accordance with the present invention also includes a liquid pump, a switching mechanism, a liquid reservoir that contains a liquid cheese or other flavored topping to be administered to the cooked popcorn, an inlet line from the assorted flavor reservoir to the pump, and an outlet line for the liquid flavoring that terminates with an outlet opening juxtapositioned above the cooked corn receiving cup chamber. The cooked corn receiving cup chamber includes a skirted turntable so that the liquid flavoring outlet opening can dispense liquid cheese that falls by gravity onto rotating cooked popcorn kernels at the top of the cup. Rotation of the turntable insures adequate distribution of the liquid flavoring and prevents the customer from prematurely removing the cup. The liquid flow of the cheese or other selected flavoring can begin either during the cooking process as the cooked popcorn is diverted through its popping action around a 90° shield at the top of the cooking chamber into the corn receiving cup mounted on the turntable, or after the cup is completely filled. Thus, the liquid distribution can begin so that the flavored liquid is distributed throughout the corn, or it can begin after the cup is filled with the cooked popcorn for distribution on the top layers of the popcorn.

The actuation of the liquid cheese or selected flavoring is optional in that the operator of the vending machine selecting the popcorn can depress a manual switch built into the vending machine equipment that turns on a timer that activates the liquid cheese pump so that the operator can either elect to receive a flavoring on the popcorn or, if not actuated, the popcorn will have no flavoring added.

The raw corn receiving chamber or reservoir is mounted at the top of the machine, preferably in a clear or transparent acrylic chamber so that one can readily tell how much popcorn (raw) remains in the reservoir.

A lockable sealed door at the top of the chamber will allow access for filling and refilling raw corn into the receiving chamber. The bottom of the chamber includes a circular conduit and outlet that allows the corn to fill the conduit by gravity. The sidewalls near the base of the chamber may be tapered so that the last bit of raw corn will fall by gravity into the bottom cylindrical outlet.

The popcorn dispenser slide tray includes an outer rectangular wall having a circular hole that fits adjacent to and snugly into the cylindrical outlet of the dispenser chamber on its top surface and, a predetermined distance away, a bottom circular hole that connects to a corn chute that diverts corn to the cooker. Inside of the slide tray is a second rectangular wall having top and bottom circular holes that are sized to coincide with the upper circular aperture connected to the raw corn dispensing chamber outlet and the corn chute, respectively, and a cylindrical movable chamber. The machine may also be activated by an electrical mechanism or bill acceptor which will activate a revolving disc with multiple chambers that is activated by a solenoid timer that rotates the disc, picking up corn from the sealed storage container and rotating that corn to the chute. The inside cylindrical slide chamber, containing a pre-measured cylindrical volume that aligns both with the outlet from the dispenser and, when moved linearly, to the chute, is connected to the vending apparatus. When the proper coin or paper money is inserted and the device is electrically or manually activated, linear motion is provided that moves the corn dispensing slide from a first position in direct communication with the corn reservoir to a second position where the corn drops by gravity into the chute. When the unit is restored to the first position, note that the corn is then in a sealed condition so that no moisture can get out of the cylindrical chamber, keeping the corn in a fresh configuration. Each time the vending apparatus is actuated, only a specific amount of raw corn is transferred to the chute, which insures that each time a cooker receives only a predetermined amount of corn for cooking.

Access to the reservoir that contains the liquid flavoring and the money reservoir that receives the coins or paper money is through the front located door that includes a lock so that unauthorized access is not permitted. Mounted on one side of the unit is an opening or chamber that has a turntable on the floor and a motor for turning the turntable that is actuated when the vending apparatus is turned on so that the turntable is powered for rotation of a cup that is placed on the turntable for receiving the popped corn.

The housing of the unit itself, which may be substantially rectangular and is sized for mounting on a countertop, includes one or more circular chambers for holding cups in an inverted position so that they are available to the operator for use in the device.

In order to operate the device, a user would step forward and place a paper cup received from the top of the housing into the opening in the front of the housing, preferably on the right hand side containing the turntable where the cup is placed. Paper money or coins are then placed into the vending apparatus, which is then mechanically or electrically actuated, causing the corn to be moved from the slide tray or dispenser into the corn chute, dropping the prescribed amount into the cooker, which has been turned on by actuation of the vending actuating mechanism so that electrical power is provided, heating the resistant coil units in the corn popper and turning on the fan that is used to blow the hot air out through the side of the unit if desired. As the corn is popped, the top of the cooker includes at least a 90° deflection shield, having an outlet opening disposed above, but off to the side of, the cup receiving chamber so that the corn bounces off the shield and is diverted into the cup, which is rotating. As the cooking process continues, the raw corn is cooked and deflected into the cup so that the cup becomes filled with cooked popcorn. If the operator desires to also have a liquid flavored topping, such as liquid cheese, the operator depresses the manual button on the front of the device, turning on power to the pump, causing liquid flavoring to be transferred from the liquid flavoring reservoir tube through the pump and being dispensed onto the popcorn. Upon the completion of the liquid transfer, the operator then can remove the cup of cooked corn containing the liquid flavoring.

The vending machine will return to its initial starting position which causes the corn measuring and dispensing slide to return to its initial position, wherein the corn is sealed from the surrounding atmosphere, preventing any moisture loss, thereby keeping the corn fresh in its storage chamber.

The owner of the vending machine or the person maintaining it can get access through a key lock on the front door, opening the door to replace the liquid flavoring when desired by just changing containers and putting the intake tube back into the container. Monies are received into a small tray and can be retrieved through the lockable door. Raw corn is added through the lockable upper top door in the corn storage chamber when desired.

The unit may be powered by conventional 120 volt AC power through a cord that is connected to power distribution circuitry for use by the cooking unit which uses electrical heating coils, to power a fan unit that can be used to cool the heating unit and also distribute the smell of fresh popcorn, to power the liquid flavoring pump, to power the vending apparatus, to power any lighting equipment on the unit, and to actuate the turntable.

It is an object of this invention to provide an improved popcorn cooking machine particularly useful for vending use.

It is another object of this invention to provide an improved popcorn cooking and vending machine that includes the additional ability to distribute a liquid flavoring to freshly cooked popcorn.

And yet still another object of this invention is to provide a compact popcorn vending machine that can cook fresh popcorn in pre-measured amounts and provide it with a liquid flavoring.

And yet still another object of this invention is to provide a popcorn vending machine wherein the raw corn remains in a fresh state in a reservoir awaiting cooking to prevent moisture from leaving the corn in the raw state.

In accordance with these and other objects which will be apparent hereinafter, the instant invention will now become described with particular reference to the accompanying drawings.

DESCRIPTION OF THE PREFERRED EMBODIMENT

Figure 1:
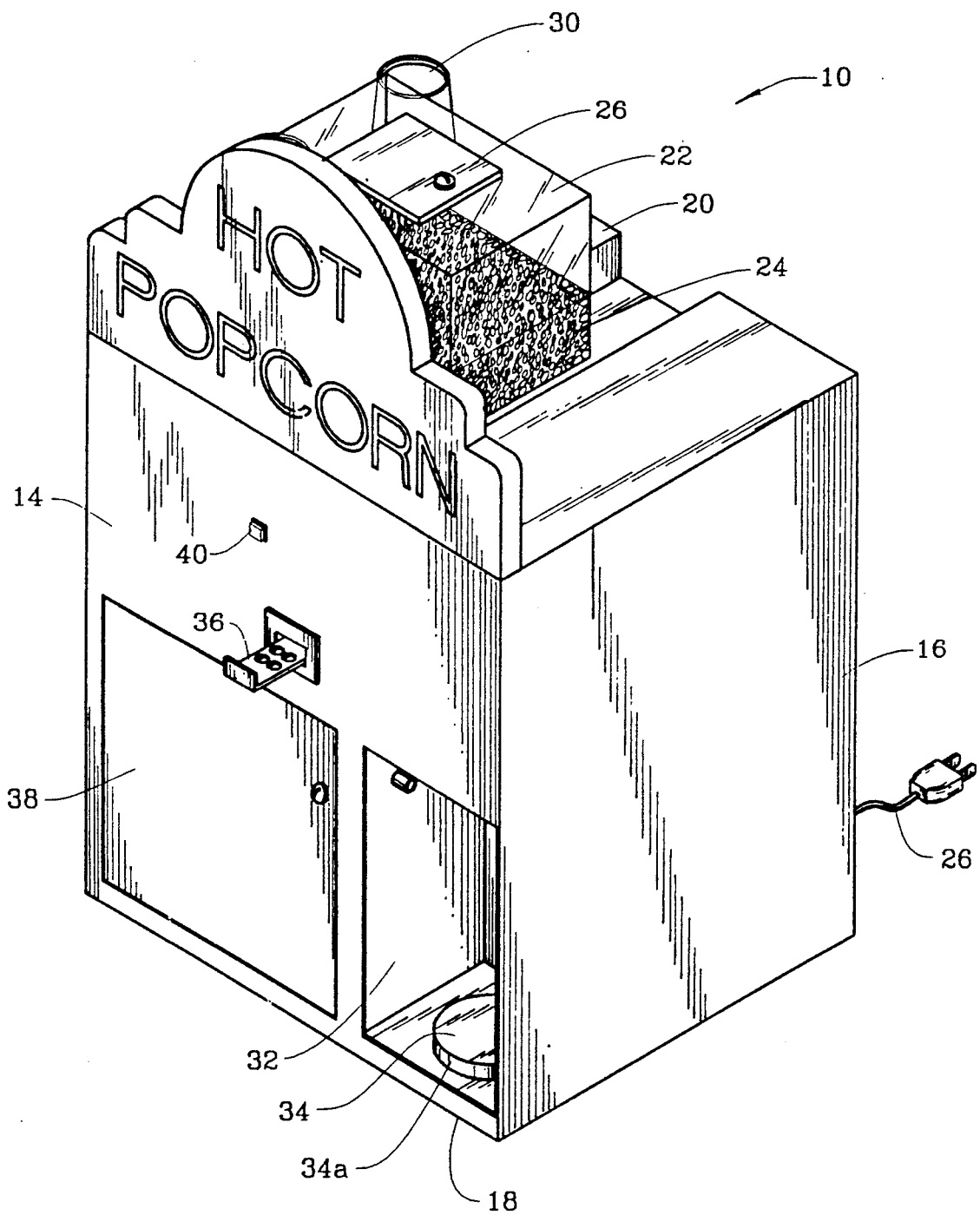
FIG. 1 shows a perspective view of the present invention.
Figure 2:
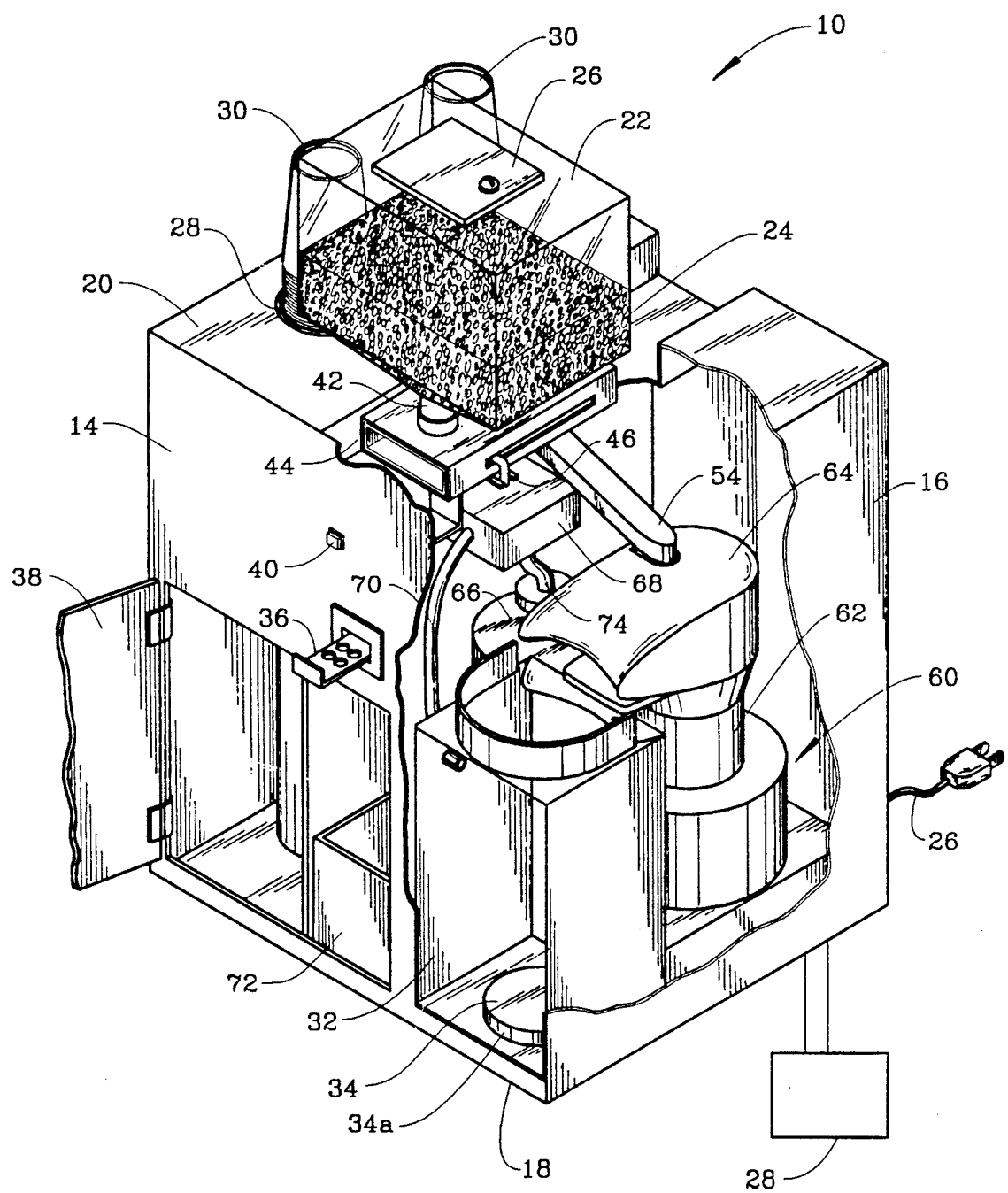
FIG. 2 shows a perspective view of the present invention with portions of the housing cut away to show the internal workings of the invention.

Referring now to the drawings, and in particular FIG. 1 and FIG. 2, the present invention is shown generally at 10 comprised of a rigid, substantially rectangular housing having a front wall 14, a rear wall (not shown), a pair of parallel sidewalls 16, a bottom wall 18, and a top wall 20, all of which may be made of metal or other suitable rigid material.

Mounted on top of the housing is a clear reservoir 22 made of acrylic plastic or the like that retains the raw corn 24. An access door 26 is disposed in the upper top of the raw corn reservoir 22 to allow access into the reservoir for adding more raw corn. The raw corn referred to is conventional raw kernels of uncooked popcorn. Adjacent the raw corn reservoir 22 are one or more cup holders 28 which may be circular recesses in the upper wall 20 for retaining a stack of cups 30 that are stacked on each other in an inverted position. The front wall upper portion may contain a sign such as that shown in FIG. 1 or a marquis front face for decorative purposes.

The front face of the front wall 14 includes several important features. First, on the right hand lower side is an access chamber 32 which is for receipt of the cooked corn. A cup 30 is placed right side up inside the access chamber at the time the machine is actuated. The bottom floor of the cooked corn access chamber contains a turntable 34 having a skirt 34a that prevents popcorn from accumulating beneath the turntable, preventing rotation, with a motor below it (not shown) that rotates a cup 30 placed on top of it when the machine is actuated.

A vending mechanism or actuator 36 is shown in the front wall 14 that in this example would receive coins that mechanically actuates the device and also turns on the electric power and other facets of the system described below. A front lockable access door 38 is shown that allows access to the interior of the machine for various purposes, not the least of which is to receive monies deposited from the vending actuator 36 and to get access to liquid flavoring reservoirs mounted inside the device in special containers or jugs that need to be replaced from time to time. Finally, the front wall 14 includes an actuating button 40 that allows one to manually select and add a liquid flavoring to the corn during and after the corn cooking process if desired. If the button 40 is not actuated, no liquid flavoring will be dispensed on the cooked popcorn.

FIG. 2 shows the device 10 partially cut away. Starting at the top, the translucent acrylic raw kernel reservoir or container 22 is shown, having a cylindrical outlet tube 42, providing a bottom outlet for the corn to fall by gravity. The top access door 26 may be key actuated to provide access for adding more raw corn 24 to the raw corn reservoir 22. Two cup holders 28 are shown adjacent the raw corn reservoir 22 with inverted cups 30 that are used to receive the popped corn.

The raw corn reservoir outlet 42 is contained in the middle of the raw corn reservoir's bottom wall. The raw corn reservoir 22 has tapered wall surfaces so that all the raw corn will drop to the cylindrical outlet 42, wherein the cylindrical outlet 42 is connected in a sealed manner to the raw corn dispenser and slide mechanism 44, which is mechanically and electrically connected to vending actuating device 36 mounted in the front wall 14 of the housing. Referring now to FIGS. 2-5, the vending actuating device 36 has a mechanical arm 46 that is L-shaped that connects to an inside slide mechanism 50 that includes a raw kernel measuring chamber 48 that is cylindrical and that can slide from a first position that allows raw kernels to be admitted by gravity from the raw popcorn kernel chamber 22 through the cylindrical outlet 42 so that the inside slide housing 50 slides to a second position where there is a lower circular aperture 52 that aligns with the raw kernel measuring chamber 48 so that the corn is then deposited by gravity into a chute 54 where it falls into the actual cooking chamber. When the inside slide mechanism 50 returns by either spring or other actuating means to its original position as shown in FIG. 3B, it can be seen that the bottom wall 58 of the inside slide mechanism 50 cuts off measuring chamber 48 from the outside atmosphere. Therefore, measuring chamber 48, which contains corn in the raw state that is received from the raw kernel reservoir 22, is not exposed to ambient atmosphere. Thus, as shown in FIG. 2, since the top door 26 of the corn reservoir 22 is sealed, the corn 24 is not subject to drying out due to ambient air, thereby allowing the corn to remain fresh at all times.

Figure 3C:
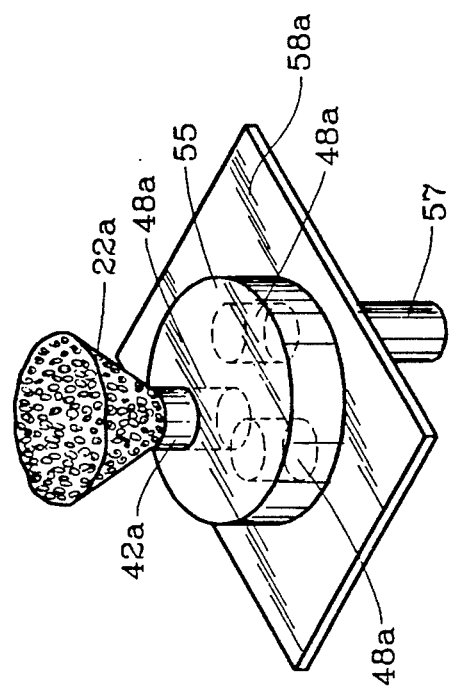
FIG. 3C shows a perspective view of an alternate raw corn transfer and measuring mechanism for use with the vending apparatus.
Figure 3A:
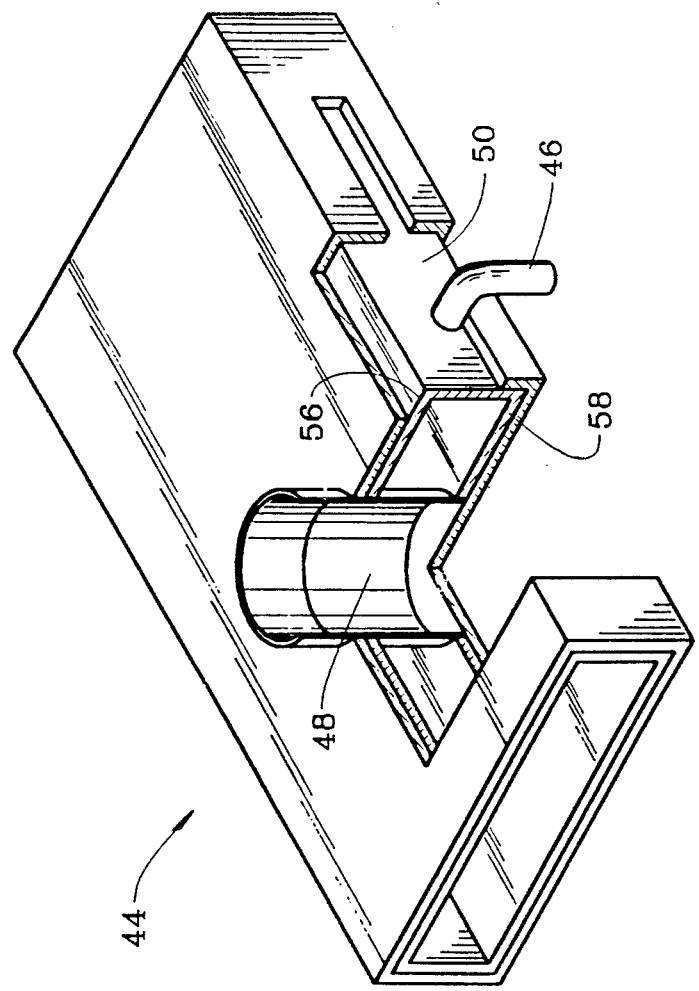
FIG. 3A shows a perspective view of the raw corn measuring and dispensing slide unit used with the present invention, partially cut away.
Figure 3B:
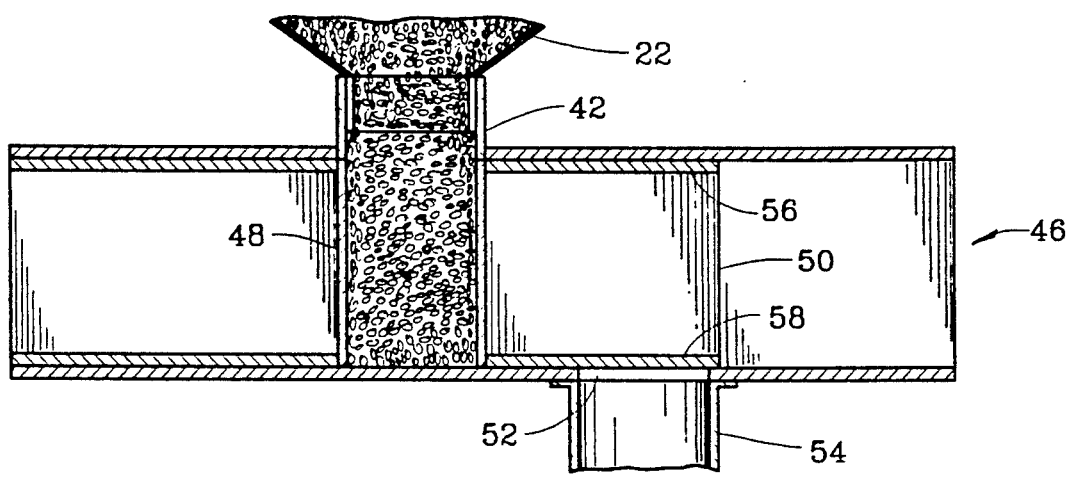
FIG. 3B shows a side elevational view in cross section of the raw corn dispensing and measuring device.

FIG. 3 shows an alternate embodiment of the raw corn measuring and dispensing mechanism that shows the raw corn reservoir 22a connected by a collar 42a to an upper plate 55 that has an aperture that allows access to the premeasuring cylinder 48a which contains just the amount of corn necessary. As the entire housing 59 is rotated, each of the cylinder chambers 48a rotate so that the one with the corn will move to a position near the corn chute 57 which has an aperture in plate 58a which allows the corn to fall into the cooker. The dispensing and measuring mechanism shown in FIG. 3C is desirable for use with a particular type of vending apparatus.

Figure 4:
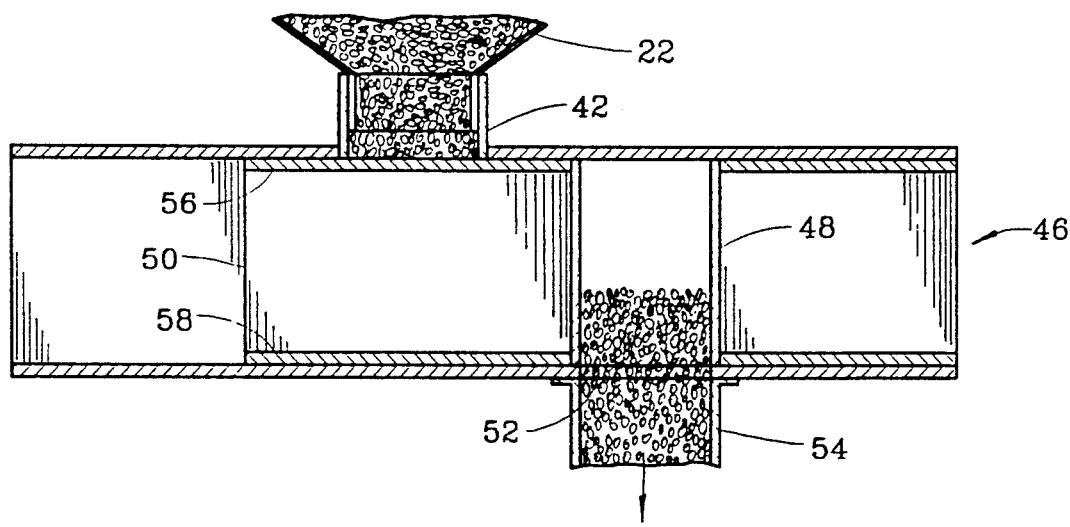
FIG. 4 shows a cross sectional view in elevation of the raw corn dispenser shown in FIG. 3B and the dispensing position where the raw corn is dispensed through the chute.
Figure 5:
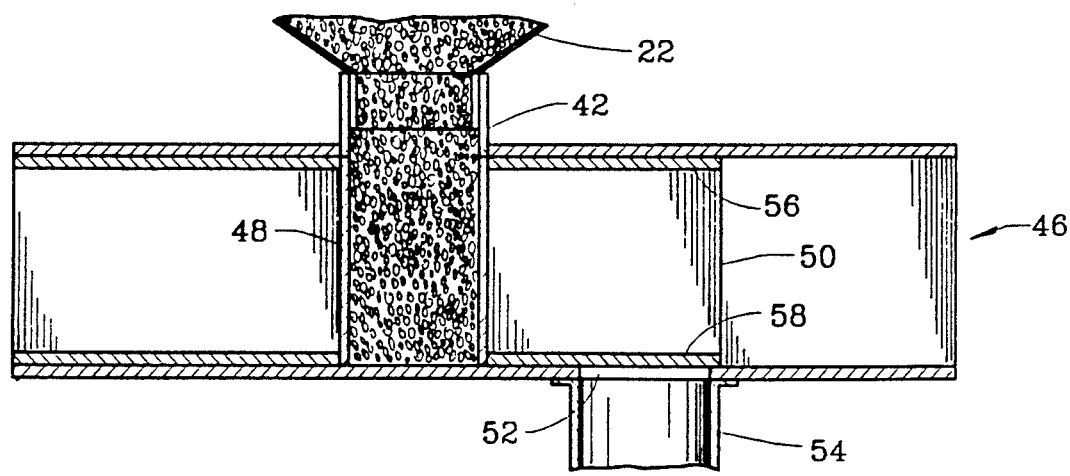
FIG. 5 shows a cross sectional view in elevation of the raw corn dispensing and measuring device in the return position after the raw corn has been dispensed and returned to the opening of the raw corn distributor.

FIG. 4 shows how the inside slide mechanism 50 takes a prescribed amount of corn that is metered out by the volume of the cylindrical corn receiving chamber 48 when moved to the second position where the corn in the chamber 48 then falls by gravity into the chute 54 for the cooking chamber. Note in FIG. 4 that the upper inside slide wall 56 abruptly effaces the outlet 42 from the raw kernel reservoir 22, preventing additional corn from being dispensed and retaining it in its position so that it is not being exposed to outside air. Finally, in looking at FIG. 5, it can be seen that when the inside metering cylindrical chamber 48 that measures out the raw corn has returned to the original position, where it is aligned coaxially with the outlet 42 of the raw kernel reservoir 22, it is maintained in a position where outside air will not affect the raw corn. As noted before, raw popcorn can get stale and ineffective for cooking if the moisture is allowed to leave the corn.

Referring back to FIG. 2, other features of the invention are shown. The cooking unit 60 is shown that includes a heated cooking chamber 62 that uses electrical current to heat a metal surface or the surrounding surface where the popcorn achieves a certain temperature and, due to the moisture in the kernel which turns to steam, causes the kernel to explode and move violently upward by a stream of air produced by an internal blower to a deflecting portion 64 where it turns approximately 90° and then goes down an incline slope where it falls into the cup receiving chamber 32. The cup receiving chamber 32, which is mounted and includes a front opening in the front wall 14, may have a door (not shown) when the device is not in use. Once access is obtained to the cup receiving chamber 32 and the cup 30 has been placed on the turntable 34 and the vending mechanism 36 actuated by insertion of money into the device 10, the heating elements (not shown) in the cooking unit 60 are stimulated and turned on, allowing the popcorn to cook, which takes approximately two minutes. Once cooked, the popcorn is carried by the air current into the cup.

The invention discloses a reservoir 66 that includes liquid flavoring such as liquid cheese connected to a pump 68 by inlet tube 74 and that has an outlet tube 70 that dispenses the liquid flavoring into a predetermined location at the top of the cup receiving chamber 32. The turntable 34 which supports the cup is rotated by a small electric motor (not shown) underneath the turntable 34 so that once the manually actuated button 40 on the front wall 14 of the device has been activated, the pump 68 will be turned on, causing liquid to move through the pump 68 and be distributed onto the top of the popcorn in the cup as the cup turns. Rotation allows for even dispensing of the liquid cheese or other flavoring as desired, and prevents the customer from prematurely removing the cup before the flavoring is dispensed.

A front access door 38 is shown partially in FIG. 2 in an open position with a tray 72 for receiving monies from the vending actuating mechanism 36.

A power cord 76 is used and provides power to the unit and to a series of timing and control circuit elements 78 that provide timing to power the cooking unit 60, power to the pump 68 for dispensing the liquid cheese, and power to the turntable 34, all of which is actuated by a timing mechanism for independent cycle times, depending on how the machine is actuated. The vending unit is conventional and may be either mechanical of electrical, as desired.

The primary advantage of the present invention resides in its ability to maintain raw popcorn kernels fresh and moist because of the storage facility and the slide mechanism for dispensing the corn which protects the corn from the damaging effects of ambient air, which would allow the corn to dry out. This is critical to a successful vending operation where popcorn may be left unattended for storage purposes for days or weeks while it is being consumed. Obviously, if the popcorn is not fresh, then the purpose of the vending machine is defeated completely.

Secondly, a very important feature of the invention is that it allows the user of the machine an option of putting a liquid flavoring, such as liquid cheese, directly on top of the popcorn at the moment of cooking so that the resultant popcorn and liquid topping are fresh and warm. The liquid topping is also kept in a preserved state in a sealed dispensing unit and reservoir that connects to the pump such that all of the liquid flavoring is evenly dispensed from the pump and its outlet tube during each vending cycle.

To operate the device as shown in FIG. 2, the user would select a cup 30 and place it in the cup receiving chamber 32 on top of the turntable 34. The user would then insert the appropriate amount of coins or paper money and actuate the vending mechanism 36 which turns on the power to the cooking unit 60 and provides power to various timing circuits including the turntable 34 and the liquid cheese pump 68. Actuation of the vending machine also triggers immediately, either manually or electrically, the inside slide mechanism 50 where a metered amount of raw corn is transferred to the chute 54 where it drops into the cooking device 60 and the slide 50 returns to its initial position, protecting the remaining raw corn from exposure to the atmosphere. When the timing circuits 78 are actuated, the cooking begins and the popcorn is cooked, the turntable 34 begins rotating and, if the user desires, the liquid cheese or other flavoring is dispensed by the user pushing the manual button 40 on the front wall 14. As the turntable 34 rotates, liquid flavoring dispensed on top of the corn is uniformly distributed. The user then removes the cup with the cooked corn and flavoring.

The vendor operator can service the device 10 by adding more raw corn 24 to the raw corn reservoir through the top access door 26 by a key. The vending operator also will have access through the front door 38 with a key to remove monies received and to add more liquid flavoring by replacing the container or reservoir therein.

An exhaust fan is mounted inside near the back of the housing to the rear of the cooker to expel heat from the housing and provide the cooked popcorn aroma into the ambient environment.

As shown, the unit is quite compact, provides for extremely fresh popcorn at all times, and provides for quickly and readily dispensed fresh popcorn with a liquid flavoring if desired. Because of the small size of the unit, it can be utilized on a countertop or other convenient location where it can be left unattended for simple operation by the user.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A popcorn vending machine for cooking fresh popcorn comprising:
   a housing, said housing having a base wall, a front wall, a back wall, two side walls, and a top wall, all of said walls connected together forming an enclosure;
   a raw kernel reservoir attached through the top wall of said housing, said raw kernel reservoir having a top and a base, said raw kernel reservoir including a sealable top opening and a conduit attached to an opening in its base;

means for metering said raw corn connected to said conduit;

vending actuating means having a first portion connected to the front wall of said housing and a second portion connected inside said housing to said raw kernel metering means;

raw kernel dispensing means connected to said metering means, said raw kernel dispensing means having an input and an output;

raw kernel chute means connected to the output of said raw kernel dispensing means, said chute means having an output;

means for cooking popcorn connected to the output of said raw kernel chute;

means for diverting cooked popcorn to a predetermined area;

a cup receiving chamber having a base, said cup receiving chamber connected to the front wall of said housing and mounted inside said housing, said cup receiving chamber having an open top in communication with an output of said cooked popcorn diverting means;

a turntable rotatably mounted in the base of said cup receiving chamber;

power means for electrical power;

circuit means connected to said power means for providing electrical power to said means for cooking popcorn, to said turntable, and to a switch means activated by said vending actuating means; and electrical timing means connected to said circuit means for providing power to said cooking means and to said turntable for a prescribed amount of time relative to said vending actuation.

2. A popcorn vending machine for cooking fresh popcorn as in claim 1, including:

a liquid flavoring reservoir mounted inside said housing;

a pump for said liquid flavoring;

a first conduit mounted between said liquid flavoring reservoir and said pump;

a second conduit mounted between said pump and the top of said cup receiving chamber, an outlet of said second conduit disposed to allow liquid arriving at the outlet of said second conduit to fall by gravity into said cup receiving chamber; and means for actuating said liquid flavoring mounted on the front wall of said housing, whereby liquid flavoring can be dispensed on top of freshly cooked popcorn received into a cup in said cup receiving chamber while being rotated by said turntable for dispensing uniformly on said popcorn, preventing premature removal of the cup.

3. The popcorn vending machine of claim 1, wherein said means for metering comprises a cylindrical chamber disposed within said raw kernel dispensing means.

4. The popcorn vending machine of claim 3, wherein said raw kernel dispensing means is moveable between a first position and a second position.

5. The popcorn vending machine of claim 1, wherein said raw kernel dispensing means includes a substantially rectangular outer wall, said outer wall having a first aperture in its top surface that fits adjacent to and snugly into said raw kernel reservoir conduit, said outer wall further having a second aperture in its bottom surface, said second aperture connecting said raw kernel dispensing means to said raw kernel chute, said raw kernel dispensing means further having a substantially rectangular inner wall slidably attached to said outer wall, said inner wall having a first aperture in its top surface and a second aperture in its bottom surface, said inner wall first and second apertures sized to coincide with said outer wall first and second apertures such that when said raw kernel dispensing means is moved linearly from said first position to said second position, said means for metering, which contains a premeasured volume of raw kernels from being in direct communication with said raw kernel reservoir in said first position, drops the raw kernels by gravity in said chute means in said second position.

6. The popcorn vending machine of claim 5, wherein the bottom surface of said inner wall cuts off said means for metering from outside atmosphere when said raw kernel dispensing means is in said first position.

7. The popcorn vending machine of claim 5, wherein the upper surface of said inner wall effaces the first aperture in said outer wall when said raw kernel dispensing means is in said second position, thereby cutting off said raw kernel reservoir from outside atmosphere.

8. The popcorn vending machine of claim 1, wherein the raw corn dispenser includes a plurality of rotating chambers having premeasured volumes, transporting the raw corn to said chute means.

* * * * *